(12) United States Patent
Girgin

(10) Patent No.: US 7,354,542 B1
(45) Date of Patent: Apr. 8, 2008

(54) LIGHTWEIGHT, HEAT INSULATING, HIGH MECHANICAL STRENGTH SHAPED PRODUCT AND METHOD OF PRODUCING THE SAME

(75) Inventor: Ismail Girgin, Ankara (TR)

(73) Assignee: Nesteks Nevsehir Tekstil Sanayi Ve Ticaret A.S., Nevehir (TR)

( * ) Notice: Subject to any disclaimer, the term of this patent is extended or adjusted under 35 U.S.C. 154(b) by 263 days.

(21) Appl. No.: 10/415,974

(22) PCT Filed: Nov. 3, 2000

(86) PCT No.: PCT/TR00/00057

§ 371 (c)(1),
(2), (4) Date: May 5, 2003

(87) PCT Pub. No.: WO02/36522

PCT Pub. Date: May 10, 2002

(51) Int. Cl.
*B29C 59/00* (2006.01)
*B28B 1/00* (2006.01)
*C04B 35/64* (2006.01)

(52) U.S. Cl. ............... 264/122; 264/109; 264/123; 264/125; 264/128; 264/603; 264/628; 264/669; 106/DIG. 2

(58) Field of Classification Search ........ 264/109–128; 106/DIG. 2
See application file for complete search history.

(56) References Cited

U.S. PATENT DOCUMENTS

| | | | | | |
|---|---|---|---|---|---|
| 2,970,061 | A | * | 1/1961 | Burnett | 501/141 |
| 3,418,403 | A | * | 12/1968 | Garnero | 264/518 |
| RE26,709 | E | * | 11/1969 | Linden et al. | 210/500.1 |
| 3,886,076 | A | * | 5/1975 | Venable | 252/62 |
| 4,172,744 | A | * | 10/1979 | Ishikawa | 156/79 |
| 4,364,994 | A | * | 12/1982 | Fogelberg | 428/316.6 |
| 4,451,294 | A | * | 5/1984 | Popov et al. | 106/602 |
| 4,719,304 | A | * | 1/1988 | Rentel et al. | 548/164 |
| 4,758,538 | A | * | 7/1988 | Satoh et al. | 501/84 |
| 5,366,547 | A | * | 11/1994 | Brabston et al. | 106/690 |

* cited by examiner

*Primary Examiner*—Christina Johnson
*Assistant Examiner*—Jeff Wollschlager
(74) *Attorney, Agent, or Firm*—Arent Fox LLP

(57) ABSTRACT

This invention relates to a process of a lightweight, heat insulating, high compressive strength, water insoluble material by heat treatment at temperatures between 650-950° C., possessing a low bulk density (from 300 to 800 kg/m$^3$) and improved heat insulating capacity ($\lambda$=0.07 to 0.25 W/m·deg.) when it has been used to form an article having a compressive strength of from 0.49 to 5.59 Mpa. The starting chemical composition comprising more than 90% by weight of either perlite, pumice or pumice related group of materials or mixture of them and an additive in quantities less than 10% by weight containing $Na_2O$ and $B_2O_3$.

7 Claims, No Drawings

LIGHTWEIGHT, HEAT INSULATING, HIGH MECHANICAL STRENGTH SHAPED PRODUCT AND METHOD OF PRODUCING THE SAME

TECHNICAL FIELD

The present invention relates to a lightweight, water insoluble and insulative shaped products comprising of expanded minerals such as perlite and/or pumice in combination with inorganic additives selected for their ability to form a strengthened permanent bond in the structure and a method producing thereof.

BACKGROUND ART

Perlite is a glassy volcanic aluminium silicate, containing 2 to 5% combined water, that expands 10-30 times its original volume when heated at temperatures between 760-1150° C. depending on the composition of the raw material. The volatilisation of the combined water during heat treatment expands the hot, softened ore into a foam that solidifies into a lightweight, cellular aggregate with bulk densities ranging between 80-240 kg/m$^3$. The resultant expanded product finds a variety of industrial and construction related applications owing to its main features of: lightweight, porosity, non-flammability, thermal insulation, noise control, anti-sweating and non-toxicity.

Pumice is a lightweight volcanic aluminium silicate with sponge like structure formed by expansion of gases while molten lava rapidly cooled. The name applies to a group of materials having similar origin and physical structure, such as pumicite, volcanic cinders, scoria, and volcanic tuff. It is always associated with recent volcanic activity and it may show acidic and basic properties depending on its $SiO_2$ and CaO/MgO contents with the pumice being more acidic and the cinders, scoria, and tuff being more basic. Pumice has a low bulk density ranging from 480-960 kg/m$^3$, a high strength to weight ratio, low thermal conductivity and low sound transmission characteristics. All these features make it desirable for use as a building material for lightweight block and concrete, an abrasive, an absorbent, a carrier for insecticides and as a mineral filler and conditioner.

Expanded perlite, pumice and pumice related group of materials, exfoliated vermiculite and phlogopite, expanded clays etc. are porous, lightweight and insulative materials which are widely consumed for building-related uses consisting of concrete aggregate, plaster aggregate, formed products and masonry and cavity fill. In the preparation of lightweight and insulative products from these materials; cement, plaster, alkali silicates (water glass) and polymeric materials of various kinds are used as binding agents. Also, fibers of organic and inorganic origin are used for reinforcing purposes in some formulations.

The products obtained suffer from disadvantages such as low resistance to water and fire, lower insulation and compressive strength values depending on the type and the quantity of the binding agent used. For example, when cement or plaster is used, the compressive strength of the formed products increase with increase of the quantity of the cement or plaster used but, corresponding disadvantages in terms of lightness and insulative properties are observed.

It would be preferable, however, to be able to bind such lightweight and insulative materials with minor amounts of binding agent such that the product obtained should be better in terms of mechanical strength, lightness, insulative properties, fire resistance and water insolubility compared to the products being already prepared therefrom.

U.S. Pat. No. 4,451,294 discloses a composition of silicate material in the form of blocks and articles consisting essentially of liquid sodium silicate, solid sodium silicate, borax and perlite. This water resistant, heat insulating ($\lambda$=0.04-0.1 W/m·deg.) material possesses a bulk density of from 100 to 300 kg/m$^3$ with a compressive strength of from 0.3 to 1 MPa and can be applied at temperatures of from −50 up to 550° C. Although water resistant, heat insulation and low bulk density characteristics of this composition are in favor, uppermost application temperature being low (550° C.) and especially maximum compressive strength value being only 1 MPa limits its use for many construction related purposes. Also, the major components of the composition are liquid and solid sodium silicates, perlite being used only from 6 to 17% as an additive.

U.S. Pat. No. 4,313,997 discloses a composition comprising 65-95% by weight of perlite and 5-35% by weight of an aqueous emulsified, tacky, polyacrylate resin. Although the amount of expanded perlite in the formulation is high, the product is suitable for use only as a board-like product because of low mechanical and low flame retardancy characteristics.

DETAILED DESCRIPTION OF THE INVENTION

It has been found that if small quantities of $Na_2O$ and $B_2O_3$ containing material is added to either expanded perlite, pumice and pumice related group of materials or an appropriate mixture of the above mentioned; lightweight, high mechanical strength, water insoluble and insulative materials in the form of blocks and articles are obtained by heat treatment. There is provided a composition comprising more than 90% by weight of either perlite, pumice or pumice related group of materials or mixture of them and an additive in quantities less than 10% by weight containing $Na_2O$ and $B_2O_3$.

This composition can be used to produce a lightweight, heat insulating, high compressive strength, water insoluble material by heat treatment at temperatures between 650-950° C., possessing a low bulk density (from 300 to 800 kg/m$^3$) and improved heat insulating capacity ($\lambda$=0.07 to 0.25 W/m·deg.) when it has been used to form an article having a compressive strength of from 0.49 to 5.59 MPa.

Significant improvements have been made available through the improved material of the present invention. First, the lesser quantity of the additive in the present invention enables a significant increase in the weighted percentage of perlite (or pumice and pumice related group of materials) which directly effect the lightness and heat insulating capacity of the product.

A second benefit of the invention is that the duration of the heat treatment is short.

Still further, the material of the instant invention is flame and heat resistant and can only be sintered at temperatures as high as 1000° C.

In a most preferred embodiment of this invention, the product comprising of expanded perlite and it is used in quantities ≧90% by weight. The expanded perlite ranges in size from 0-1 mm to 0-6 mm. Instead of perlite, raw materials such as pumice or pumice related group of materials pumicite, scoria, volcanic cinders, volcanic tuff), expanded clays, exfoliated vermiculite, exfoliated phlogopite or an appropriate mixture of all the mentioned materials can be used.

The additive may be selected from a group containing either kernite, tincalconite (tincal), borax ore or concentrates; sodium tetraborate pentahydrate, sodium tetraborate decahydrate, anhydrous (fused) sodium tetraborate, a mixture of sodium hydroxide and boric acid and a mixture of sodium carbonate and boric acid or a combination of the said additives. The additives can be used either in dry powder form, as aqueous slurry or as a solution.

Additive is added onto expanded perlite, thoroughly mixed. If necessary, a sufficient amount of water is added to form a thick slurry and the mixture is thoroughly mixed. Then, the mixture is molded into the desired shape.

The molded mixture is heated under closely controlled temperature between 650-950° C. from about 10 minutes to 2 hours.

The following examples illustrate this invention:

EXAMPLE 1

A mixture was prepared consisting of:
93.3% by weight of expanded perlite particle size below 0.7 mm, bulk density=297 kg/m$^3$)
6.7% by weight of milled tincalconite concentrate ($B_2O_3$ content=32%)

Sufficient amount of water, to be able to mold the mixture into shape, was added and the mixture was thoroughly mixed, molded into shape and the mold was heated at 750° C. for 1 hour. The article produced possessed a bulk density of 415 kg/m$^3$; compressive strength of 0.69 MPa and a coefficient of thermal conductivity $\lambda$=0.080 W/m·deg.

EXAMPLE 2

A mixture was prepared consisting of:
93.8% by weight of expanded perlite (particle size between 0-2 mm, bulk density=70.5 kg/m$^3$)
6.2% by weight of sodium tetraborate decahydrate (99.5% pure)

Sufficient amount of water was added to the mixture, thoroughly mixed, molded into shape and the mold was heated at 900° C. for 1 hour. The article produced possessed a bulk density of 400 kg/m$^3$; compressive strength of 2.84 MPa and a coefficient of thermal conductivity $\lambda$=0.076 W/m·deg.

EXAMPLE 3

A mixture was prepared consisting of:
96.1% by weight of expanded perlite (particle size between 0-1 mm, bulk density=60 kg/m$^3$)
3.9% by weight of anhydrous (fused) sodium tetraborate (99% pure), in the form of 8% aqueous solution The mixture was thoroughly mixed, molded into shape and then heated at 900° C. for 15 minutes. The article produced possessed a bulk density of 597 kg/m$^3$; compressive strength of 3.59 MPa and a coefficient of thermal conductivity $\lambda$=0.099 W/m·deg.

EXAMPLE 4

A mixture was prepared consisting of:
96.9% by weight of pumice (particle size between 0-3 mm, bulk density=645 kg/m$^3$)
3.1% by weight of anhydrous (fused) sodium tetraborate (99% pure)

Sufficient amount of water was added to the mixture, thoroughly mixed, molded into shape and the mold was heated at 650° C. for 30 minutes. The article produced possessed a bulk density of 631 kg/m$^3$; compressive strength of 1.74 MPa and a coefficient of thermal conductivity $\lambda$=0.189 W/m·deg.

EXAMPLE 5

A mixture was prepared consisting of:
96.8% by weight of pumice (particle size between 0-3 mm, bulk density=645 kg/m$^3$)
3.2% by weight of sodium tetraborate decahydrate (99.5% pure)

Sufficient amount of water to be able to mold the mixture into shape, was added to the mixture, thoroughly mixed, molded into shape and the mold was heated at 825° C. for 10 minutes. The article produced possessed a bulk density of 603 kg/m$^3$; compressive strength of 2.16 MPa and a coefficient of thermal conductivity $\lambda$=0.175 W/m·deg.

EXAMPLE 6

A mixture was prepared consisting of:
93.4% by weight of pumice (particle size between 0-3 mm, bulk density=645 kg/m$^3$)
6.6% by weight of milled tincalconit concentrate ($B_{203}$ content=32%), in the form of 20% by weight aqueous slurry The mixture was thoroughly mixed, molded into shape and the mold was heated at 825° C. for 30 minutes. The article produced possessed a bulk density of 625 kg/m$^3$; compressive strength of 2.96 MPa and a coefficient of thermal conductivity $\lambda$=0.189 W/m·deg.

Although the invention is illustrated and described with reference to all the specific features described in connection with the preferred embodiments, it is to be understood that changes to certain features which do not alter the overall function and concept of the invention may be made without departing from the spirit and scope of the invention, as defined in the claims.

The invention claimed is:

1. A process for the formation of a material consisting essentially of the following steps:
 a) forming a mixture consisting of: (i) greater than 90% by weight of a mineral selected from the group consisting of expanded perlite, pumice, pumice related materials selected from the group consisting of pumicite, scoria, volcanic cinders, volcanic tuff, exfoliated vermiculite, exfoliated phlogopite, and a combination thereof, and (ii) less than 10% by weight of a binding agent containing $Na_2O$ and $B_2O_3$ selected from the group consisting of kernite ore, kernite concentrate, tincalconite ore, tincalconite concentrate, borax ore, borax concentrate, sodium tetraborate pentahydrate, sodium tetraborate decahydrate, anhydrous sodium tetraborate, a mixture of sodium hydroxide and boric acid, a mixture of sodium carbonate and boric acid and any combination thereof, wherein the binding agent is provided in a form selected from the group consisting of a dry powder, an aqueous solution, and an aqueous slurry;
 b) adding a sufficient amount of water to form a slurry;
 c) molding said slurry into a desired shape; and
 d) heating the molded mixture under closely controlled temperature to a temperature between 650-950° C.;
 wherein said mixture forms a strengthened permanent bond in the product when heated.

2. The process of claim 1 wherein the particle size of expanded perlite is 6 mm or less.

3. The process of claim 1 wherein the particle size for pumice is less than 30 mm.

4. The process of claim 1 wherein the particle size for pumice related materials is less than 3.0 mm.

5. The process of claim 1, wherein the heating step is a single, continuous step.

6. The process of claim 1, wherein a duration of the heating step is in a range that exceeds 10 minutes and is less than 2 hours.

7. A process for the formation of a lightweight, insulative material consisting of the following steps:
   a) forming a mixture consisting of: (i) greater than 90% by weight of a mineral selected from the group consisting of expanded perlite, pumice, and a combination thereof, and (ii) less than 10% by weight of a binding agent containing $Na_2O$ and $B_2O_3$, wherein the binding agent is provided in a form selected from the group consisting of a dry powder, an aqueous solution, and an aqueous slurry;
   b) adding a sufficient amount of water to form a slurry;
   c) molding said slurry into a desired shape; and
   d) heating the molded mixture to a temperature between 650-950° C.

* * * * *

UNITED STATES PATENT AND TRADEMARK OFFICE
CERTIFICATE OF CORRECTION

PATENT NO. : 7,354,542 B1
APPLICATION NO. : 10/415974
DATED : April 8, 2008
INVENTOR(S) : Ismail Girgin It is certified that error appears in the above-identified patent and that said Letters Patent is hereby corrected as shown below:

Title Page-

In (73) Assignee, please correct to read as follows:

--(73) Assignee: Ismail Girgin, Ankara (TR)--.

Signed and Sealed this

Twenty-fifth Day of August, 2009

David J. Kappos
*Director of the United States Patent and Trademark Office*